(12) United States Patent
Agathangelos

(10) Patent No.: US 10,721,203 B2
(45) Date of Patent: Jul. 21, 2020

(54) METHOD, DEVICE AND SOFTWARE PRODUCT FOR FILLING AN ADDRESS FIELD OF AN ELECTRONIC MESSAGE

(71) Applicant: Unify GmbH & Co. KG, Munich (DE)

(72) Inventor: Antonios Agathangelos, Drapetsona (GR)

(73) Assignee: RINGCENTRAL, INC., Belmont, CA (US)

( * ) Notice: Subject to any disclaimer, the term of this patent is extended or adjusted under 35 U.S.C. 154(b) by 3 days.

(21) Appl. No.: 15/935,699

(22) Filed: Mar. 26, 2018

(65) Prior Publication Data

US 2018/0219827 A1 Aug. 2, 2018

Related U.S. Application Data

(63) Continuation of application No. 14/870,862, filed on Sep. 30, 2015, now abandoned.

(30) Foreign Application Priority Data

Oct. 2, 2014 (EP) .................................... 14003412

(51) Int. Cl.
*H04L 12/58* (2006.01)
*G06Q 10/10* (2012.01)

(52) U.S. Cl.
CPC ........... *H04L 51/28* (2013.01); *G06Q 10/107* (2013.01)

(58) Field of Classification Search
CPC ..... H04L 51/22; H04L 51/04; H04L 29/1215; H04L 29/12726; H04L 51/18

(Continued)

(56) References Cited

U.S. PATENT DOCUMENTS 7,178,099 B2 * 2/2007 Meyer .................. G06Q 10/107 715/210
7,546,284 B1 * 6/2009 Martinez ............. G06F 16/2471

(Continued)

FOREIGN PATENT DOCUMENTS

| CN | 101346737 A | 1/2009 |
| CN | 102655484 A | 9/2012 |
| CN | 103065237 A | 4/2013 |

OTHER PUBLICATIONS

Wikipedia: "Microsoft Office", Internet Article, Sep. 21, 2014 (Sep. 21, 2014), XP055425272, Retrieved from the Internet: URL:https://en.wikipedia.org/w/index.php? title=Microsoft_Office&oldid=626496225 [retrieved on Nov. 15, 2017].

(Continued)

*Primary Examiner* — Mahran Y Abu Roumi
(74) *Attorney, Agent, or Firm* — Finnegan, Henderson, Farabow, Garrett & Dunner LLP

(57) ABSTRACT

A content, context or the like as entered by a user may be used to automatically evaluate a recipient or recipients to whom the message is directed. A method for filling a recipient address field of an electronic message in a messaging application executable on a communication terminal begins by selecting a content chunk from a content area of said message and deciding whether said content chunk matches a predefined addressee identifier pattern. If the content chunk matches a predefined addressee identifier pattern then the a name portion is extracted from the content chunk. The name portion is compared with entries in a predefined directory. It the name portion matches an entry then a recipient address proposal is created based on an address stored in the directory. That recipient address proposal is filled into said recipient address field of said message.

20 Claims, 7 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 7,917,576 | B1* | 3/2011 | Kling | H04L 51/066 709/203 |
| 2002/0169839 | A1* | 11/2002 | Goldberg | G06Q 10/107 709/206 |
| 2002/0178228 | A1* | 11/2002 | Goldberg | G06Q 10/107 709/206 |
| 2003/0195937 | A1* | 10/2003 | Kircher, Jr. | G06Q 10/107 709/207 |
| 2006/0026244 | A1* | 2/2006 | Watson | G06Q 10/107 709/206 |
| 2007/0005701 | A1* | 1/2007 | Barsness | H04L 51/04 709/205 |
| 2007/0070940 | A1* | 3/2007 | Vander Veen | G06Q 10/107 370/328 |
| 2007/0088852 | A1* | 4/2007 | Levkovitz | H04L 12/1859 709/246 |
| 2007/0162339 | A1* | 7/2007 | Arning | G06Q 10/107 705/14.1 |
| 2007/0264977 | A1* | 11/2007 | Zinn | H04M 1/274525 455/414.1 |
| 2008/0104177 | A1* | 5/2008 | Keohane | G06Q 10/107 709/206 |
| 2009/0106367 | A1* | 4/2009 | Banerjee | G06Q 10/107 709/206 |
| 2009/0157830 | A1* | 6/2009 | Kim | G06Q 10/107 709/206 |
| 2009/0214034 | A1* | 8/2009 | Mehrotra | G06Q 10/107 380/255 |
| 2009/0240832 | A1* | 9/2009 | Miyama | H04L 49/90 709/234 |
| 2010/0191825 | A1* | 7/2010 | Yamagishi | H04L 67/104 709/217 |
| 2010/0332608 | A1* | 12/2010 | Wei | H04L 51/00 709/206 |
| 2011/0202864 | A1* | 8/2011 | Hirsch | G06F 3/0482 715/773 |
| 2012/0089692 | A1* | 4/2012 | Stoddard | G06Q 10/107 709/206 |
| 2013/0117383 | A1 | 5/2013 | Hymel | |
| 2013/0198112 | A1* | 8/2013 | Bhat | G06F 9/50 705/400 |
| 2013/0227031 | A1* | 8/2013 | Wells | H04L 51/28 709/206 |
| 2013/0326133 | A1* | 12/2013 | Lee | G06F 12/0875 711/108 |
| 2014/0006299 | A1* | 1/2014 | Acree | G06Q 10/1053 705/321 |
| 2014/0304614 | A1* | 10/2014 | McAlear | G06Q 10/107 715/752 |
| 2015/0117721 | A1* | 4/2015 | Rhodes | G06Q 10/10 382/112 |
| 2017/0004517 | A1* | 1/2017 | Jaggi | G06F 17/2785 |

OTHER PUBLICATIONS

Gini Courter et al: "Mastering Microsoft Office 2003 for Business Professionals", Nov. 21, 2003 (Nov. 21, 2003), Sybex, XP055425259, ISBN: 9780782142280 pp. 22-24,29-32.

Andrew S. Tanenbaum et al: "Distributed Systems: Principles and Paradigms (2nd Edition)", Oct. 12, 2006 (Oct. 12, 2006), Prentice Hall, XP055304550, ISBN: 978-0-13-239227-3 pp. 0-68,236.

Misty E. Vermaat: "Discovering Computers: Essentials (Shelly Cashman) 1st Edition", Mar. 4, 2013 (Mar. 4, 2013), Course Technology, XP055302032, ISBN: 978-1-285-16178-5.

Wikipedia: "Webmail", Internet Article, Aug. 19, 2014 (Aug. 19, 2014), XP055425281, Retrieved from the Internet: URL:https://en.wikipedia.org/w/index.php?title=Webmail&oldid=621892861 [retrieved on Nov. 11, 2017].

Wikipedia: "Unified messaging", Internet Article, Feb. 3, 2014 (Feb. 3, 2014), XP055425171, Retrieved from the Internet: URL:https://en.wikipedia.org/w/index.php? title=Unified messaging&oldid=593784110 [retrieved on Nov. 2017 -151].

Wikipedia: "Pattern matching", Internet Article, Aug. 17, 2014 (Aug. 17, 2014), XP055425176, Retrieved from the Internet: URL:https:// en.wikipedia.org/w/index.php? title=Pattern_matching&oldid=621641669 [retrieved on Nov. 2017 -151].

David Mertz et al: "Text Processing in Python", Jun. 12, 2003 (Jun. 12, 2003), Addison-Wesley Professional, XP055425422, ISBN: 978-0-321-11254-5 p. 336.

Wikipedia: "Autocomplete", Internet Article, Sep. 4, 2014 (Sep. 4, 2014), XP055153177, Retrieved from the Internet: URL:http://en/wikipedia.org/w/index.php?title=Autocomplete&oldid=624208199[retrieved on Nov. 14, 2014] * see section "3.2 in e-mail programs"; the whole document.

Jennifer Fulton et al.: "Outlook 2007 All-in-One Dest Reference for Dummies", May 7, 2007 (May 7, 2007), For Dummies, XP055153648, ISBN: 978-0-47-004672-2 pp. 99-100, * p. 99-p. 100 *.

* cited by examiner

METHOD, DEVICE AND SOFTWARE PRODUCT FOR FILLING AN ADDRESS FIELD OF AN ELECTRONIC MESSAGE

CROSS-REFERENCE TO RELATED APPLICATIONS

This application is a continuation application of U.S. patent application Ser. No. 14/870,862, which claims priority to European Patent Application No. EP 14003412.5, filed on Oct. 2, 2014.

FIELD OF INVENTION

The present invention relates to a method for method for filling an address field of an electronic message. The invention also relates to a corresponding device and software product.

BACKGROUND OF THE INVENTION

An electronic message such as an email, SMS, or the like usually includes a message body and a message head, optionally attachments. The message body usually is a single data field containing the main content of the message in text form. Optionally, the text may be formatted and may include hyper links, signature code or image, and/or embedded media files. The message head usually includes a plurality of data fields and should at least include a recipient address field (known as "To" field), and a sender address field (known as "From" field). Additionally, the message head may include data fields dedicated for a subject text, addresses of an additional recipient (carbon copy recipient, known as "Cc" field) and/or a hidden additional recipient (blind carbon copy recipient, known as "Bcc" field), and selectors like Relevancy, Privacy, Verification-of-Receipt, and others. The address fields usually are prepared for including one or more data items each representing a single address. More than one item in an address field may be referred to as an address list which are, on a data level, usually separated by some delimiting character(-s). The sender address field usually includes a single sender address as a data item. In a messaging client's user interface, each data field to be defined/filled by a user may be represented by a tab or input box, a checkbox, a scroll menu, a control button, or the like.

Currently, the only way to set the recipient address in an email is by manually editing the recipient tab (or field). This method has the drawback that it requires an explicit action. If someone wants to send one same email massively to several recipients which do not belong to a group, and each message should be personalised (like an email from a bank or from a Human Resources (HR) department), the user has to repeat this action hundreds or thousands of times.

Up to now the only methods existing to help in this problem is first the auto-complete feature which keeps in a cache a list of email accounts that have been used (meaning sent to or received an email from them) and suggests them by just typing some letters from the recipient's email account in the recipient's tab. Second for the case of sending one same email to a large number of people that cannot be grouped, there is the OUTLOOK* "template" or "forms" method in which a user can create personalised templates or forms including the recipients account, save them and use them in the future (note that terms marked by an asterisk (*) here and throughout this application may be subject to trademark protection by their respective owners; mentioning such terms in this application is purely for illustrating the background or possible application of the present invention).

An OUTLOOK* plug-in ("PhraseExpress") is known to provide text modules and a number of macros, which can be incorporated in the text modules. Such macros allow for automatic adaptation of a text module to the present requirements (e.g. one macro may determine the gender of a recipient and another macro uses this to adapt the salutation accordingly). The already filled "To" field, other (marked) emails, etc. are used by the macros to pick up the required information.

The sender address field is usually filled automatically by the email client's main algorithm. In case a user uses more than one email client and/or addresses simultaneously, the user may manually select or fill the proper address in the sender address tab.

An object of the present invention is to provide a method, a device and a software product for filling an address field of an electronic message which are able to at least partly alleviate the drawbacks of the prior art as mentioned above. In particular, an object of the present invention is to provide such a method, device and software product which are able to alleviate, minimise or even eliminate the further actions needed for setting the recipient address and/or sender address.

The aforementioned object or objects of the invention is/are solved at least in parts by the features of the independent claims. Advantageous embodiments and further developments of the invention are set forth in the subclaims.

SUMMARY OF THE INVENTION

The basic idea of the present invention is to automatically fill an address field, i.e., a recipient and/or sender address field, of an electronic message by using the context of the message to extract the needed information and then append it to the appropriate entry.

It will be noted that a message in the sense of the invention is understood to be a data structure (data set) which is separated into different data fields which in turn may consist of one or more data items (but may also be empty except some mandatory fields). Any message type usually at least includes a header and a body where the header usually at least includes a recipient address as a data field, and the body includes a message text. Most message types also include a sender address and a subject, as data fields of the header. Many message types (such as emails) include not only one recipient address filed but include a main recipient address field (usually referred to as "To" field), a secondary recipient address field (usually referred to as "Cc" field for "Carbon copy"), and a hidden recipient address field (usually referred to as "Bcc" field for "Blind carbon copy") which are all address fields in the sense of the invention, and may be altogether referred to as an address area. Any address field may contain a plurality of addresses each of which forms a data item. Further data fields may contain control information (such as relevancy information or requested confirmation of receipt), file attachments, and others. As not only the body but also the subject may contain individual information which may be evaluated, both body and subject are referred to as content fields, and as a content area altogether, in the sense of the present invention. Any data field except the (main or only) recipient address field usually may be left empty while still defining a valid message. The body may contain pure text or formatted text. It is noted that control items are usually of fixed form, address fields are usually controlled by a messaging client so as to meet a certain data format prescribed by the messaging protocol, and may be verified with a global address server so as to meet a valid address, and content fields are usually freely configurable while in some contexts may be limited in length.

Therefore, a first aspect of the invention is a method for filling a recipient address field of an electronic message in a messaging application executable on a communication terminal connected to a network over which messages are sent, said method comprising the steps:

selecting a content chunk from a content area of said message;

deciding whether said content chunk matches a predefined addressee identifier pattern; and if said content chunk is decided to match said predefined addressee identifier pattern:

extracting a name portion from said content chunk, comparing said name portion with an entry of entries of a predefined directory, and if said name portion matches said entry:

creating a recipient address proposal based on an address stored in said entry and suitable for a format of the electronic message, and filling said recipient address proposal into said recipient address field of said message.

Electronic messaging has been widely used in the recent decades. In this sense the electronic message may be, for example, an email, an SMS, or the like, and may be structured as explained above. Forwarding of the electronic message may be accomplished by networks like the internet, an intranet, a telephone network, a cellular network, or a combination of those networks. An address may be an email address, phone number, URL or the like. A content area is a data area defining a content which the sender wishes to transmit, and may include a body, i.e., a main text content, and/or a subject field of the message. In general, a content area includes plain text but may also include formatted text and/or embedded media. The inventive method\, however, chiefly makes use of alpharethmetic content included in the content area. A content chunk may be any fraction of the content area. In particular the method implicitly includes generating one or a plurality of content chunks, by dividing the content. Chunk length may be adapted to the length of said predefined addressee identifier pattern; having more than one predefined pattern may require repeating the dividing into chunks, selection thereof and subsequent steps with different chunk lengths. As a length of a name portion included in a chunk is usually unknown in advance, the method may start from a prescribed or determined maximum length, and repeat the dividing, selecting and subsequent steps with decreasing chunk lengths. A format of the electronic message relates to the protocol used for transmitting the message (e.g., e-mail, SMS, FTP, URL, . . . ) and/or context (private/professional). The address field may be any address field (main, secondary, hidden, or one-and-only). Filling the address fields may be made after each creation of said recipient address proposal, or upon a certain condition, e.g., user interaction or when writing of the message is finished.

The comparing and subsequent steps may be executed repeatedly in series and/or in parallel for a plurality of entries. The extracting and subsequent steps may be executed repeatedly in series and/or in parallel for a plurality of name portions found in a content chunk. The selecting and subsequent steps may be executed repeatedly in series and/or in parallel for a plurality of content chunks.

The predefined addressee identifier pattern may be taken from a pattern catalogue, wherein the deciding and further steps may be repeatedly executed, regarding said content chunk, for any addressee identifier pattern provided in said pattern catalogue, wherein said pattern catalogue preferably may be sorted and/or scanned in the order of decreasing chunk length. The pattern catalogue may be editable by a user of said application. In this case, repeating the deciding and further steps may be stopped when a match is decided for one addressee identifier pattern because usually it is unlikely that a further match will be found. As longer addressee identifier patterns are taken first, matching precision may be enhanced. Adaptable means that patterns may be added, changed, or deleted from the predefined pattern catalogue, by interaction of said user, preferably by a user dialog.

The recipient address proposal may be a recipient address list, wherein said creating step may include adding said address stored in said entry, to said recipient address list; and said filling step may include filling all or selected addresses from said recipient address list into said recipient address field. Selection may be made by user interaction, e.g., by manually picking or deleting some of them, and/or automatically by applying a predefined selection pattern. Such selection pattern may, e.g., include deletion of duplicates.

The method may include the further steps to be executed prior to executing said filling step:

offering said recipient address list to a user of said application for selection and/or verification; and discarding addresses not selected and/or verified by said user, from said recipient address list.

Offering may preferably be accomplished by calling a user dialog; this step may be omitted if the recipient list is unambiguous.

The recipient address field may include a plurality of recipient address sub-fields; and said recipient address list may include a plurality of recipient address sub-lists corresponding to said plurality of recipient address sub-fields, wherein said predefined pattern may be assigned to at least one of said recipient address sub-lists. A selection by the user or user-selection mentioned above may include shifting an address from one recipient address sub-list to another. Subfields may be, e.g., previously mentioned "To", "Cc", "Bcc" fields. Assignment of said predefined pattern may be accomplished by applying rules allowing a precise assignment to any of said sub-fields. E.g., a content chunk like "I will forward this message to Bill" may trigger a pattern match, extracting "Bill" as a name portion, seeking any Bill, William or the like in the prename field of the application's or user's or a computer's directory, and proposing any suitable address found in said directory, to be filled into the "Cc" sub-field.

The recipient address proposal may be offered to a user of said application, upon explicit command by said user or automatically during writing of said message by said user. Said command may be a click on a button or any suitable input or selection tool. Thereby, proposals may be collected until the end of writing the message. In the second alternative, any time a pattern match is found, the user may be given the opportunity to add a respective person's address to the recipient address field.

The method may include the further steps:

breaking said name portion into name fractions corresponding to respective data fields in said directory, said name fractions for example including at least one of a prename, surname, title, and/or salutation; and comparing said name portion with said entries of said directory by name fractions.

A second aspect of the present invention is a method for filling a sender address field of an electronic message in a messaging application executable on a communication terminal, said messaging application managing a plurality of sender addresses of a user of said application, said method comprising the steps:

selecting a content chunk from a content field of said message;

deciding whether said content chunk matches a predefined addressee identifier pattern; and if said content chunk is decided to match said predefined addressee identifier pattern:

extracting a name portion from said content chunk, comparing said name portion with at least one entry of entries of a predefined directory, and if said name portion matches one entry of said at least one entry of entries of said directory:

creating a sender address proposal suitable for a format of the electronic message, based on information stored in said one entry of said directory, and filling said sender address proposal into said sender address field of said message.

This aspect of the present invention makes use of the conception that knowing an addressee, i.e., recipient, of a message may indicate a context per se of said message, and hence makes it possible to select a sender address fitting said context. Information stored in an entry may be, e.g., tags like family, job, etc., as found in a plurality of address directories.

A third aspect of the present invention is a method for filling a sender address field of an electronic message in a messaging application executable on a communication terminal, said messaging application providing a plurality of sender addresses of a user of said application, said method comprising the steps:

selecting a content chunk from a content field of said message;

deciding whether said content chunk matches a predefined contextual pattern; and if said content chunk is decided to match said predefined contextual pattern:

creating a sender address proposal suitable for a format of the electronic message, by selecting a sender address fitting said contextual pattern, out of said sender addresses of said user, and filling said sender address proposal into said sender address field of said message.

A pattern in the sense of this aspect may be any pattern which is suitable for identifying the context of the message, e.g., appellation, salutation, topic. Fitting may be evaluated by directly assigning each pattern to a sender address, or by defining contexts or domains of said user, assigning each sender address and each contextual pattern to at least one of said contexts or domains, and selecting a sender address context or domain of which matches the contextual pattern's context or domain.

The method of any of the preceding aspects may be executed at predefined points of time, preferably periodically, during said message is being written by a user. This allows adaptation of the recipient address proposal, e.g., by narrowing likeliness of a certain entry.

In the method of any of the preceding aspects, said message may be an email or an SMS, wherein the method is preferably executed in the form of an email application plug-in, e.g. OUTLOOK* plug-in, a browser ad-in or a mobile messaging application.

The method of any of the preceding aspects may be repeatedly executed for a plurality of content chunks, said content chunks being generated from a whole content area or selected parts thereof, wherein said content chunk preferably is a first line altogether or a first line having characters of said message. This is a special case which may be particularly easy to accomplish and low in processing load while covering a majority of cases. Alternatively, the content chunk may be selected from any part of the content area which would require a lot of iterations, probably shifting the selection for content chunk character by character, with varying chunk lengths.

In the method of any of the preceding aspects, said communication terminal may be a server, client, desktop computer, portable computer, tablet, telephone, mobile phone, smart phone, PDA, or the like.

A further aspect of the present invention is a device being adapted to execute a messaging application, said messaging application being adapted to execute any of the afore-described methods, for filling a recipient and/or sender address field of an electronic message in a messaging application executable on said device. The device preferably is a server, client, desktop computer, portable computer, tablet, telephone, mobile phone, smart phone, PDA, or the like.

A further aspect of the invention is a computer program product/software product for filling a recipient and/or sender address field of an electronic message in a messaging application executable on a communication terminal, said computer program product being stored on computer-readable medium, preferably being directly loadable into an internal memory of a communication terminal, and including program code for performing the steps of the afore-described method when said computer program is executed by said communication terminal. Evidently the present invention may as well be embodied by a computer program including instructions causing a communication terminal to perform the steps of the afore-described method when said computer program is loaded in or executed by said communication terminal, or by a digital data carrier having electrically readable control signals which are designed to operate with a programmable computer, said control signals being designed and adapted to cause the computer to perform the steps of the afore-described method. In any such cases, the computer may also be embodied by the device of the described aspect of the invention, a communication device such as a mobile phone, smart phone or the like, a server such as a collaboration server, call management server, conference server or the like, a personal computer or the like. The software product may be a plug-in, add-on, app or the like to be included in or used by or co-executed with said messaging application.

Further features, objects, advantages, and details of the present invention will become more apparent from the following description of specific embodiments of the invention and respective illustration in the appended drawings. Obviously, features, objects, advantages, and details of a specific embodiment, its variations and modifications mutatis mutandis apply to other embodiments, variations and modifications unless such application obviously violates technical constraints or laws of nature. Embodiments may be combined with each other, and any combination of an embodiment with another embodiment as a whole or in terms of single features thereof may be assumed to constitute an embodiment of the invention.

Next, the invention is described referring to specific embodiments and referring to the accompanying drawings.

Figure 1:
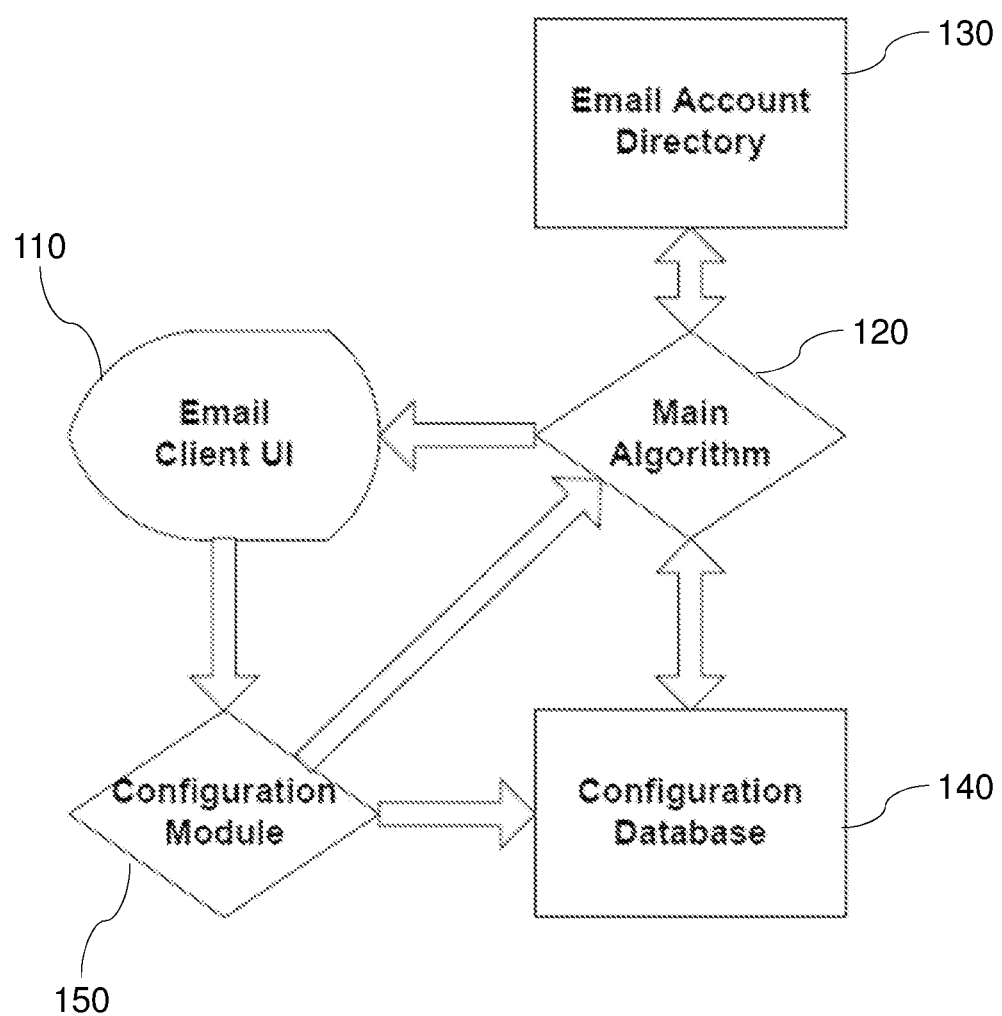
FIG. 1 is a block diagram of a general outline of an email client according to an embodiment the invention.

It is to be noted that the drawings are purely schematic and not necessarily to scale. The drawings and descriptions are to illustrate the principle underlying the invention, rather than to limit the invention in any way. The present invention is only limited by the appended claims.

DESCRIPTION OF THE PRESENT PREFERRED EMBODIMENTS

As mentioned above, a general idea of this application is to provide a method that solves the problems mentioned above by eliminating the further actions needed for setting the recipient address of an electronic message and doing this automatically by using the context of the message to extract the needed information and then append it to the appropriate entry.

The implementing concept of the present invention is described in the context of an email.

The invention starts out from the finding that a considerable amount of the emails sent between colleagues inside a company or between a company and its clients use a formal format. In this format an email usually starts with the phrase like "Hello Mr./Mrs." following the surname and/or the first letter of the first name after a comma. Instead of "Hello" it is also common to have "Good morning" or Good Evening" and instead of "Mr./Mrs." it is also known to use "Dr," or something similar. Also, it is often used a symbol like "@" and then a name of a person to whom the following text in the email content is referring. All these define popular patterns that almost everyone is using in email communication. These patterns are going to be the configuration or otherwise the rules that will have to be agreed and may be setup initially by the user or by default so that the method of the present invention can work. These patterns will be used as identifiers for the method in order to detect the recipient's attributes upon which it will retrieve the actual recipient's email address. The definition of these patterns can be of any alpharethmetic (i. e., any string that can be generated by characters acceptable and/or reproducible by the email client user interface) format, can be modified, enhanced or deleted at any time but they should be very precise in setting them up and in afterwards usage inside the mail content and there should always be at least one. Default phrases may be set, e.g., to be "Hello Mr. Surname,", "Hello Mrs. Surname,", "Dear Mr. Surname,", "Dear Mrs. Surname", and so on.

Now, a basic functionality of the method will be described.

The method has to fulfil the following tasks.

A first process or process section is designed to parse the content of the email and try to match and identify the words or phrases that have been set up (e.g., by the user) in a configuration step as patterns. The parsing in this context means that a content of the email is broken down into chunks of content which are to be compared, one by one, with each identifier pattern so as to evaluate a possible match. Content chunks may be of fixed length or variable length. Parsing may start from a whole content and may go down to levels of line or paragraph, sentence or clause or even word or phrase. Here, parsing may reduce chunk length step by step, so as to generate a vast number of content chunks. On the other hand, in a very simple parsing, only a first line of an email may be chosen as a content chunk as a good percentage of information needed for identifying a desired recipient may be found in this very first line. Also, content is not limited to a body of the email but may also be extended to a subject field.

Assuming that a match is found of at least one pattern, in order to continue, the method moves to a second process or process section which is to extract the name of the recipient. This can be done by reading the word after the pattern as it is set by the rules in the first step, e.g. "Hello Mr. Agathangelos,", until a space or comma or dot is identified. After having extracted the name/s of the recipient/s, the method makes a query to the directory that holds the email accounts information in order to receive the actual email address that matches to each corresponding name. If more than one match is found for a single query, all returned values are kept.

The next step is to populate these addresses to the recipient tab. If only one email address is found then this one is set automatically to the "To . . . " field. If more than one email address is found then, according to the configuration, all recipients may be set to the "To . . . " field, or the first one (in alphabetical order or by some sorting algorithm) may be set to the "To . . . " field while all the others to the "Cc . . . " field, or the list of potential email addresses is matched to certain patterns and an automatic filling is done accordingly, or a user dialog is started for him or her to make his or her choice. Finally, the user may be informed that actions are finished and the user may review the recipients list for verification. This step is useful for cases where the queries returned more than one result for each one, e. g. antonios.agathangelos@unify.com and george.agathangelos@unify.com for queering the name "agathangelos". The final step can be avoided if accurate rules like using a pattern like "Hello Mr. Surname First name," are chosen to be used, which will have "one to one" matching queries only.

In case that a contact person extracted by the method has more than one email address, e.g., for personal and business use, the method may further apply additional patterns or even more sophisticated technologies such as text/context analysis techniques so as to enable the method to decide on whether a personal or professional context is present, in the email, and choose an appropriate address from a plurality of said recipient's addresses.

Now, the invention is described in more detail, making reference to a preferred embodiment of the invention.

FIG. 1 shows a block diagram of a general outline of an email client 100 according to an embodiment the invention. Email client 100 includes a user interface (UI) 110, a main algorithm 120, an email account directory 130, a configuration database 140, and a configuration module 150. It should be evident that email client 100 may include further functional units which, however, are omitted for the sake of convenience and not making unclear the scope and meaning of the present invention. Flow of data and/or control is illustrated by arrows in FIG. 1. It is to be noted that the direction of data and/or command flow is only schematic and exemplary and should not be construed to limit the invention in any regard.

Figure 2:
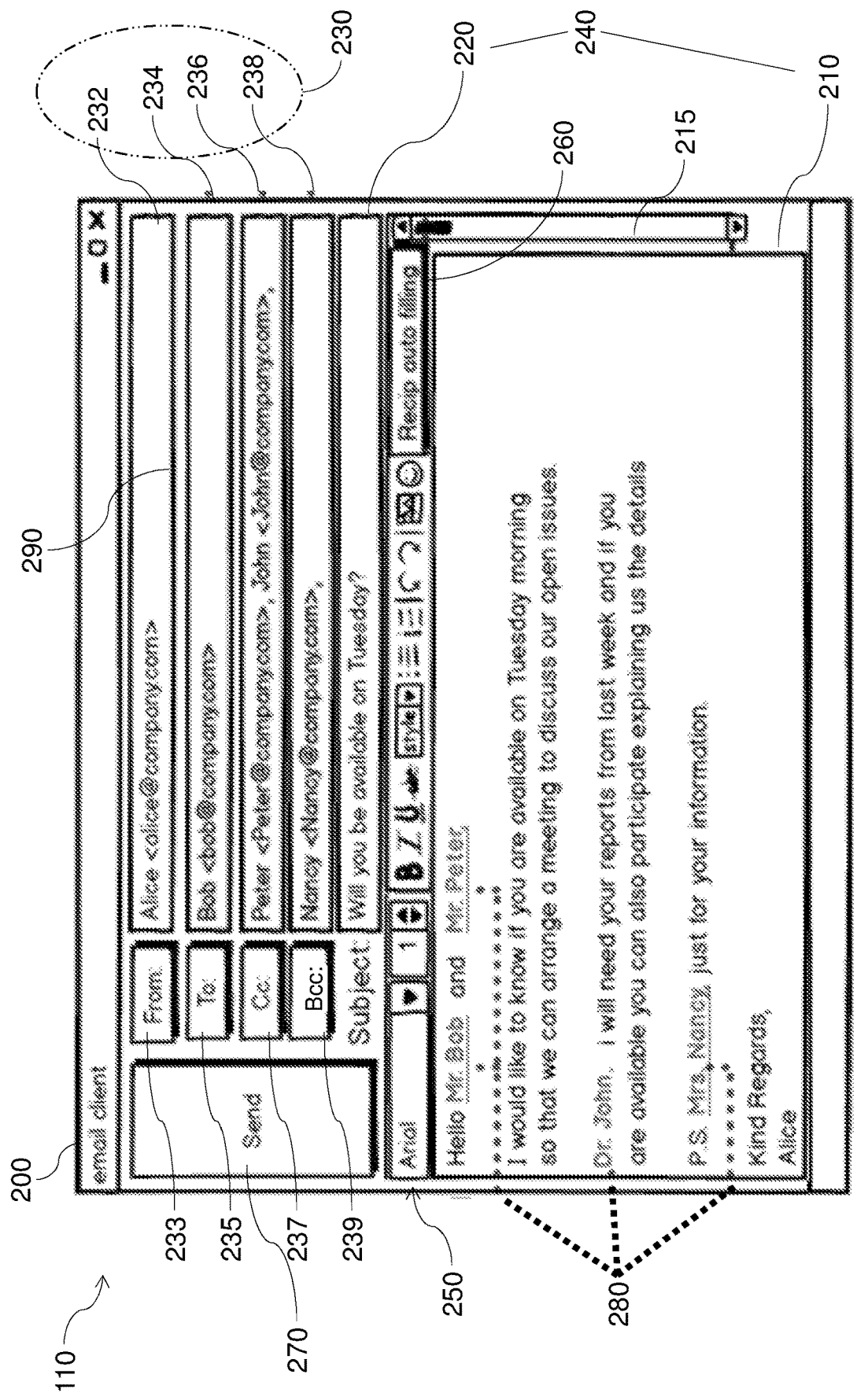
FIG. 2 is a representation of an email client user interface according to an embodiment of the invention.

Next, email client user interface (UI) 110 is further explained referring to an exemplary embodiment of the invention. In this regard, FIG. 2 shows a representation of email client user interface 110 as occurring, e.g., on a computer screen or the like, according to this embodiment of the invention.

Email client 100 generates a window or screen 200 which allows a user (not shown) to define, formulate, format, and send an email. Email client screen 200 includes numerous control buttons, menus, and input boxes manipulable by the user.

A main input box 210 allows a user to formulate his or her message in text form, and represents the main content or body of the message. It is to be noted that, while the invention is described here to make use of text content only, main input box 210 may include formatted text and/or embedded media as well. A scroll bar 215 allows to shift content included in input area 210 up and down. A subject input box 220 allows a user to enter a subject of the message in text form. Main input box 210 and subject input box 220 contain the body and subject of the message, respectively, which represent content fields of the message's data structure, altogether forming a content area 240 in the sense of the present invention.

It is to be understood that input boxes and other graphical elements such as control buttons or menus shown in window 200 represent the current contents of certain data fields of the message as a data structure. In other words, data currently populating the email's data fields instantaneously show up, e.g., as text in respective input boxes, highlighted menu item in respective dropdown or scroll menus, shadowing status of respective control buttons, or the like, in window 200. In turn, any user action such as text input, menu selection or button click instantaneously changes the contents of the respective data fields of the message in this pre-sent state, and is reflected by the contents or status of the respective input box, menu or control button. Therefore, contents or status of graphical elements of window 200 may be understood as a synonym of contents of the respective data elements of the message, and vice versa.

An address area 230 is formed by entries of a sender address input box 232 ("From"), a main recipient address input box 234 ("To"), a secondary recipient address input box 236 ("Cc"), and a hidden recipient address input box 238 ("Bcc"). The "From", "To", and "Bcc" input boxes 232, 234, 238 show one address each while "Cc" input box 236 shows two addresses which is, however, an assumption in this example and shall not limit the invention in any regard. It is noted that "From:", "To:", "Cc:" and "Bcc:" buttons 233, 235, 237, 239 placed in front of the respective address input boxes 232, 234, 236, 238 may trigger opening email account directory 130 (FIG. 1) in a further window, dialog box, menu or the like, so as to manually search and/or select addresses therefrom and put them into the respective input box and/or input boxes 232, 234, 236, 238.

A control block 250 includes numerous menus and control buttons for formatting the message text in main input box 210, for undoing and repeating actions on the message text in main input box 210, to add attachments or predetermined graphic elements such as emoticons, and also includes a "Recip. auto filling" control button 260 for triggering an automatic recipient address filling functionality to be described later. A "Send" button 270 is to manually trigger sending the finished message to the selected recipients.

As will be later described in more details, "Recip. auto filling" control button 260 is for enabling and controlling the automatic recipient address filling functionality which forms a central teaching of the present application. In short, such functionality is designed to parse the content of the main input box 210, i.e., the main content of the message, into content chunks 280 so as to detect configured identifiers such as "Mr.", "Mrs.", "Dr." and the like, extract name portions following those identifiers, search matching entries from email account directory 130, and filling them into recipient address input boxes (i.e., respective recipient address fields of the message's data structure). In the example illustrated in FIG. 2, four content chunks 280 have been highlighted which include an identifier pattern and a subsequent key word or name portion. Mr., Dr. and Mrs. may be configured identifiers 280 that the automatic recipient address filling functionality searches so that it is able to acquire the key word or key words following the identifiers. Based on the acquired key word or key words, the filling functionality recovers the data/addresses to be inserted in the address input box or address input boxes 232, 234, 236, 238. It is noted that the automatically filled address fields represent or include a recipient address proposal (symbolized by double-dotted chain line area 290 in FIG. 2) in the sense of the present invention which may or may not be accepted by the user. It will further be noted that this example uses a very simple pattern including only titles/salutations as identifier patterns, and rather simple rules such as that the very first name extracted go to the "To" field, further names go to the "Cc" field, and names extracted just above a complimentary close go to the "Bcc" field. Vagueness is accepted here because the proposal 290 may be changed by the user at any time.

Figure 3:
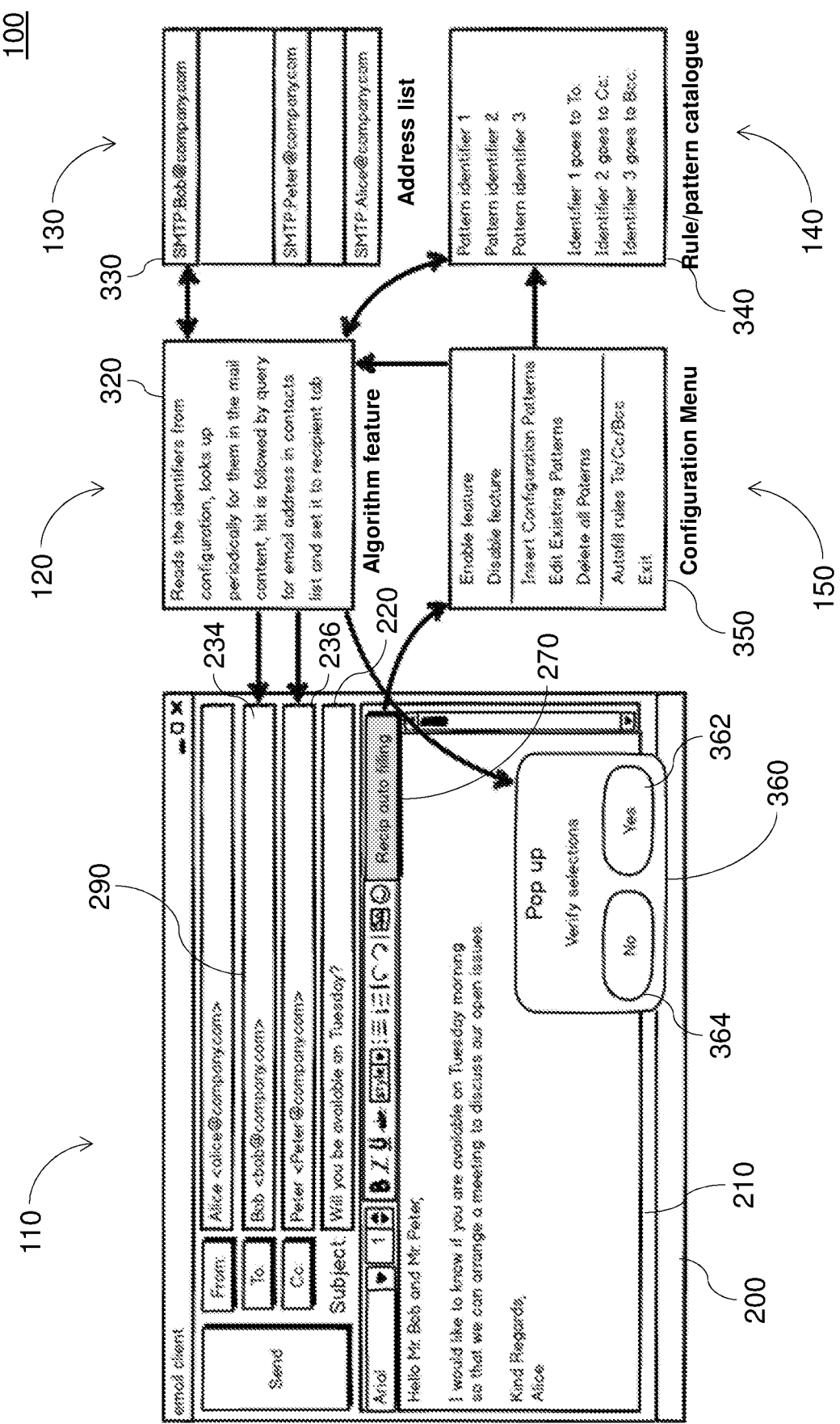
FIG. 3 is a more detailed illustration of the email client general structure of FIG. 1 with exemplary functional implications according to an embodiment of the invention.

FIG. 3 gives a more detailed illustration of the email client general structure of FIG. 1 according to an embodiment of the invention. FIG. 3 is similar to FIG. 2, however, FIG. 3 provides additional indication of further functionality.

In FIG. 3, email client 100 is illustrated with its email client user interface 110, main algorithm 120, account directory 130, configuration database 140, and configuration module. User interface 110 includes a screen 200 with elements similar to those of FIG. 2, however, entered content in main input box 210 and subject input box 220 as well as generated recipient address proposal 290 in "To" input box 234 and "Cc" input box 236 differ from the example shown in FIG. 2. Moreover, a "Bcc" input box is not shown in the present example of FIG. 3 which, however, does not exclude the possibility that such "Bcc" input box may be popped up on behalf of the user, or automatically when the main algorithm decides that a hidden recipient address is to be included in the respective data field.

As shown in FIG. 3, main algorithm 120 includes an algorithm feature 320 which may be understood to be a plug-in, add-on, or the like, of main algorithm 120, executing a process representing a functionality of the method of the present invention. Then, email account directory 130 includes an email address list 330 with a plurality of email addresses which have been previously stored manually by the user or automatically by the client. Furthermore, configuration database 140 includes a rule/pattern catalogue 340 of pattern identifiers and associated allocation rules. In the example depicted in FIG. 3, three pattern identifiers (Pattern identifier 1, Pattern identifier 2, and Pattern identifier 3) and three respectively associated allocation rules are provided in rule/pattern catalogue 340. A first allocation rule which is shortly expressed as "Identifier 1 goes to To:" means that an email address matching a name portion extracted in the context of pattern identifier 1 is to be assumed as a main recipient address ("To"), and proposed for inclusion in the respective data filed of the email. Likewise, a second allocation rule which is shortly expressed as "Identifier 2 goes to Cc:" means that an email address matching a name portion extracted in the context of pattern identifier 2 is to be assumed as a secondary recipient address("Cc"), and proposed for inclusion in the respective data filed of the email. Finally, a third allocation rule which is shortly expressed as "Identifier 3 goes to Bcc:" means that an email address matching a name portion extracted in the context of pattern identifier 3 is to be assumed as a hidden recipient address ("Bcc"), and proposed for inclusion in the respective data filed of the email.

In this example, the expression "in the context of pattern identifier . . . " may be understood as "directly following pattern identifier . . . ". As shown in FIG. 3, the word "Hello" is defined as pattern identifier 1, so "Mr. Bob" would be extracted as a name part as it directly follows the word "Hello", and an email address matching the name part "Mr. Bob" would be looked up in email address list 330, and a matching email address would be added to a main recipient address area of recipient address proposal 290. Furthermore, the expression "and" is defined as pattern identifier 2 where it follows a previously identified pattern identifier and name portion, so "Mr. Peter" would be extracted as a name part as it directly follows "Hello Mr. Bob and", and an email address matching the name part "Mr. Peter" would be looked up in email address list 330, and a matching email address would be added to a secondary recipient address area of, forming part of recipient address proposal 290. However, these patterns and rules are strictly exemplary and are meant to explain this feature of the invention rather than limit the same. For example, the expressions "P.S." and "just for your information" may be defined as pattern identifiers, and the associated allocation rule could prescribe that a name part is to be extracted from between these two expression, as indicated in FIG. 2.

As further shown in FIG. 3, if a user activates the Recip auto filling button 270 by, e.g., clicking on it by a mouse curser, entering a prescribed keyboard command, or the like, configuration module 150 is activated and a configuration menu 350 is popped up. Configuration menu 350 offers a plurality of selectable menu items for
i. enabling the feature,
ii. disabling the feature,
iii. inserting a configuration pattern,
iv. editing existing patterns,
v. deleting all patterns,
vi. autofill address input boxes according to rules regarding To/Cc/Bcc, and
vii. exiting the menu.

Now, implications and functions of configuration menu 350 are described in more detail.

Selecting the "Enable feature" menu item of configuration menu 350 activates an algorithm feature 320 of the email client's main algorithm 120 which will then run in the background, executing a process representing the recipient automatic filling method of the present invention until the user selects the "Disabling feature" menu item. In other words, selecting the "Enable feature" menu item of configuration menu 350 starts main algorithm feature 320 while selecting the "Disable feature" menu item stops main algorithm feature 320.

When enabled, algorithm feature 320 executes a process representing a core of the recipient automatic filling method of the present invention. Feature 320 makes use of contact list 330 stored in email account directory 130 and makes further use of pattern identifiers and associated allocation rules stored in rule/pattern catalogue 340 of configuration database 140. Described in short, algorithm feature 320 reads the identifiers from the configuration database 140, looks periodically for the rules in the email content as entered in main input box 210, follows a hit by query for a matching email address in address list 330, stores a matching email address in respective areas of recipient address proposal 290 in accordance with the allocation rules set in rule/pattern catalogue 340 of configuration database 140, and in the end sets the addresses stored in the recipient address proposal 290 to the allocated input boxes 234, 236, 238 which means filling them into the respective address fields of the message.

It is to be noted that, in order to avoid distraction while writing the email content, filling of recipient address input boxes 234, 236, 238 may be subject to explicit user command, i.e., selecting the "autofill rules To/Cc/Bcc" item in configuration menu 350. When selected, feature 320 fills the respective input boxes. Even if not shown in the drawing, recipient addresses generated by the algorithm may be highlighted in recipient address input boxes 234, 236, 238 so as to distinguish them from recipient addresses which have already entered manually or automatically before. Then, feature 320 pops up a dialog box 360 allowing the user to verify the recipient address proposal 290 by selecting a "Yes" button 362, or discard the recipient address proposal 290 by selecting a "No" button 364. If the user discards the proposal, the proposed recipient addresses are removed. If the user verifies the proposal, the proposed recipient addresses are kept while highlighting of proposed addresses, as far as applied, is undone.

The present invention should not be construed to be limited to the above functionality. In an alternative example of functionality, is possible to instantaneously fill an identified recipient address to the allocated input box (tab) 234, 236, 238, optionally highlighted, preferably avoiding duplicate entries, and the user may or may not edit the input boxes as required, instantaneously, or only after finishing the email content. In that case, selecting the "autofill rules To/Cc/Bcc" item in configuration menu 350 may trigger a review of addresses filled in recipient address input boxes 234, 236, 238, i.e., and the algorithm feature 320 is run a last time so as to fill the input boxes with recipient addresses according to the current state of email content. Optionally the input boxes are cleared prior to running feature 320.

In a further variation of the above example, before filling the addresses of recipient address proposal 290 into the respective input boxes, a dialog box different from dialog box 360 shown in FIG. 3 may be generated and popped up, including a preliminary address list representing the recipient address proposal 290, said preliminary address list including markers indicating which address field each address is preliminarily allocated to, giving the user a tool to edit the proposal by deleting individual addresses, or by reallocating an individual address to another address area (e.g., "To" field instead of "Cc" field, etc.), and only after user verification the proposal is filled into the respective input boxes. In a yet further variation, the preliminary address list mentioned above may be split into sub-lists, e.g., a preliminary "To" address sub-list, a preliminary "Cc" address sub-list, and a preliminary "Bcc" address sub-list. These sub-lists may be shown in parallel besides each other, and the user may be given a tool to delete individual addresses or to shift individual addresses from one address sub-list to another.

It will be noted that a number of pattern identifiers and associated rules may be stored by default in configuration database 140 so that the method (the algorithm feature) 320 may work even if the user decides not to edit the configuration database 140.

When an email is sent, the feature 320 may be kept activated for the next email to be written, or may alternatively be disabled automatically. These options may be settable by the user through a further configuration task.

Figure 4A:
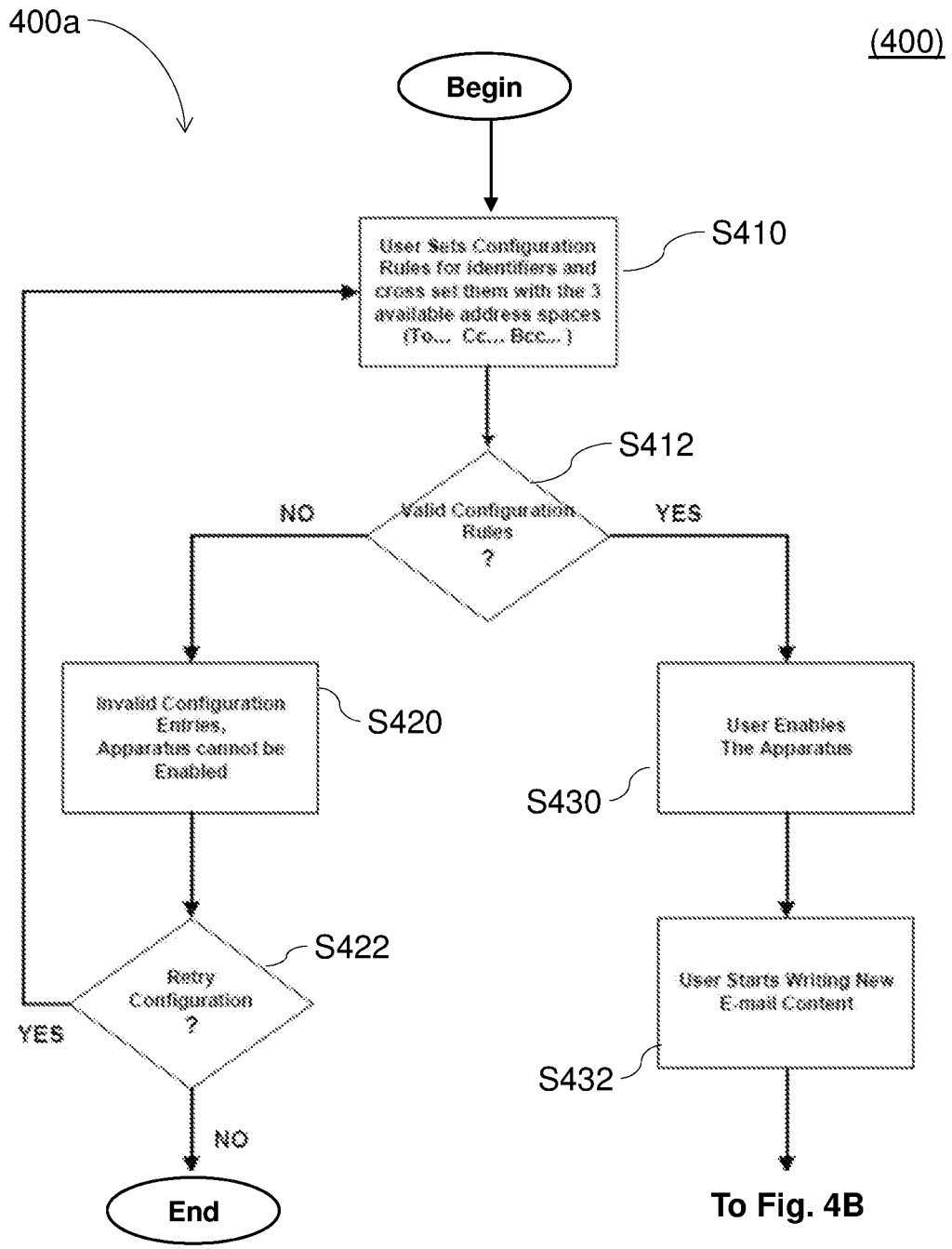
FIGS. 4A to 4C are flowcharts of respective sections of a process according to an embodiment of the invention.

Next, a process 400 will be described with reference to FIGS. 4A-4C, forming an embodiment of the present invention. Process 400 includes a configuration section 400a, a analyzing section 400b, and a finalising section 400c. In this embodiment, feature 320 is assumed to be executed by a dedicated apparatus. The invention, however, is not limited to this. The apparatus may be part of a device executing the main algorithm of email client 100 or the email client 100 as a whole, adapted and/or expanded by a plug-in, add-on, app or the like, i.e., by some software item, or some hardware extension, chip, card, stick, dongle, or others. Any step of the method, hence, may be taken as a feature of the apparatus, and vice versa, where applicable.

First, configuration section 400a of process 400 will be described with reference to FIG. 4A.

Beginning of process 400 may be assumed to be triggered by calling menu 350 (FIG. 3) for the first time by clicking control button 270. First, then, a step S410 is provided where the user sets configuration rules for pattern identifiers and cross-sets them with the three available recipient address spaces (To . . . Cc . . . Bcc . . . ) (340 in FIG. 3). Step 410 may be called automatically or upon user demand, e.g., by selecting one of the insert, edit, or delete patterns (menu items iii, iv, v of configuration menu 350 in FIG. 3). In other words, step S410 may include a query (optionally, in the form of an interrupt periodically produced during run of later sections of the process) judging whether a user has selected a respective menu item, and starting the associated configuration task. Step S410 may be finished by user action (e.g., clicking a "Done" button in a rule defining menu), or just by skipping any configuration task.

After step S410, follows step S412 judging whether or not valid configuration rules are set. If any invalid configuration rule was found ("NO" in step S412), the process continues to step S420 determining that the apparatus mentioned above cannot be enabled. Step S420 may include a user dialog informing the user that configuration has failed, inviting for further user action.

Thereafter, step S422 judges whether or not a configuration is to be retried (e.g., by evaluating user action from a user dialog generated in step S420). If the answer in step S422 is "YES", the process returns to step S410 while if the answer in step S422 is "NO", the process ends.

If in Step S412 any configuration rule entry was found to be valid ("YES" in step S412), the process continues to step S430 giving the user an opportunity to enabling the apparatus by, e.g., popping up menu 350 again. In case user should not enable the apparatus, the process remains at hold. Exiting menu 350 without enabling the apparatus may end the process for this time.

Step S432 follows where the user may start writing new email content. I.e., at this point, the user has enabled the feature (apparatus) and exited menu 350. At this point, configuration section 400a of process 400 is finished, and the process enters into analyzing section 400b illustrated in FIG. 4B.

Figure 4B:
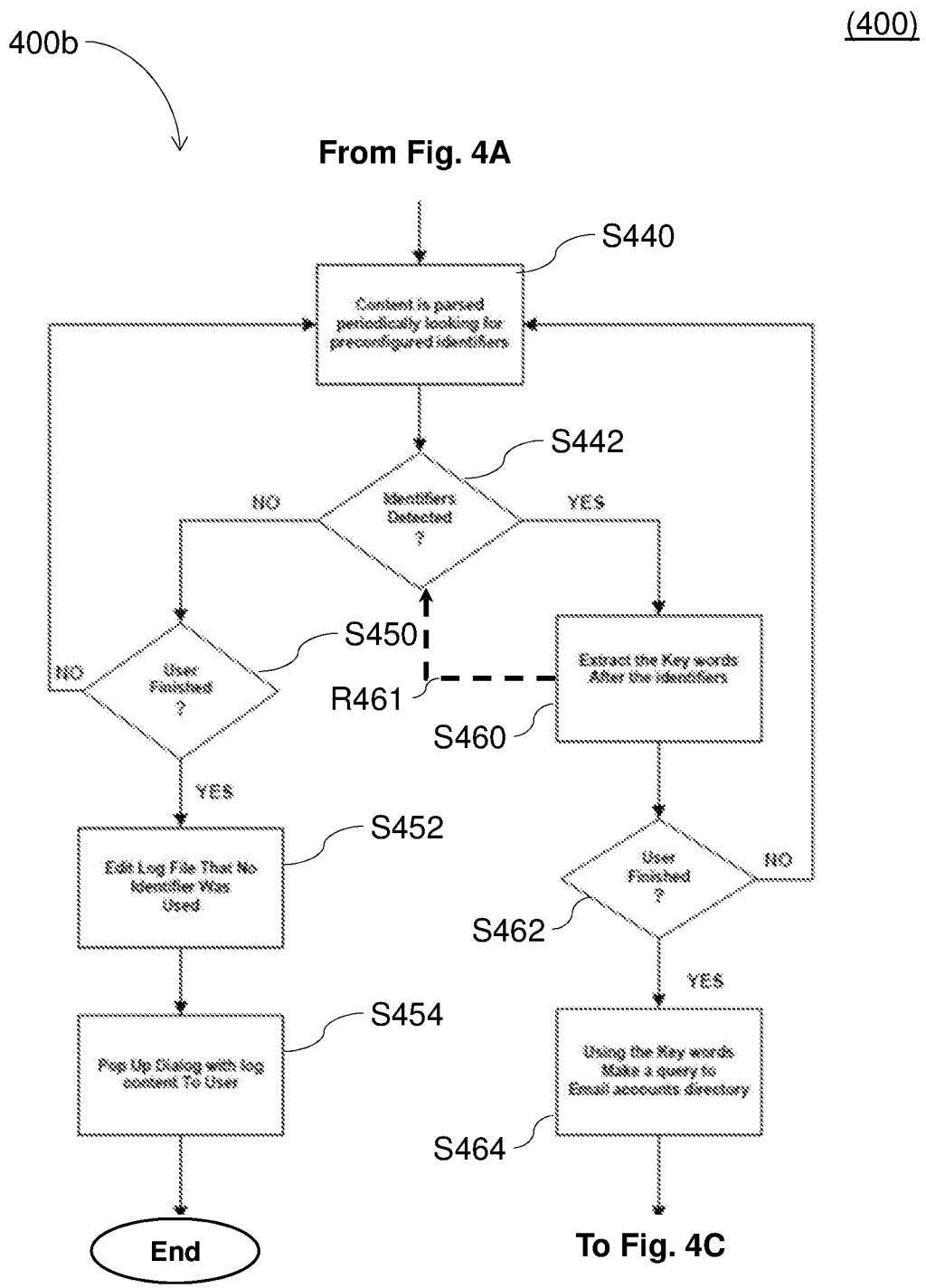

Referring to FIG. 4B, entering analyzing section 400a, step S440 is called which parses content of the email presently being written, looking for preconfigured identifiers. This step is to be explained in more detail. In the sense of the present invention, parsing of step S440 means dividing the email content into content chunks, and then, looking means selecting, one by one, a content chunk and deciding whether or not said content chunk matches a predefined addressee identifier pattern. Hence, step S440 may return any content chunk which matches at least one of addressee identifier patterns which may be represented, in the present example, by pattern identifiers 1, 2, 3 set in rule/pattern catalogue 340 in FIG. 3.

Then, step S442 judges whether or not at least one identifier was detected, i.e., whether or not any content chunk matching at least one of said addressee identifier patterns was returned by step S440. If no identifier was detected ("NO" in step S442), the process continues to step S450 judging whether or not the user has finished. User finishing may be affirmed when, e.g., "Send" button 270 was clicked, or menu 350 was called again and the "Disable feature" was selected by the user. In case user has not finished ("NO" in step S450), the process returns to step S440. Otherwise ("YES" in step S450), the process continues to step S452 editing a log file that no identifier was used, followed by step S454 popping up a user dialog including the log content. Then, the process ends.

If an identifier (i.e., at least one identifier) was detected ("YES" in step S442), the process continues to step S460 extracting key words after the respective identifiers. These key words are interpreted by the process as name portions of the respective content chunks. It is to be noted that extracting the key words from the content chunk at a respective prescribed location or under a respective prescribed condition within the pattern, is to be understood as part of the pattern per se, as defined in rule/pattern catalogue 340. There may be patterns which demand extracting the key words in front of the respective identifier, or between two identifiers. Patterns may prescribe that certain skipwords (e.g., words like "friend", "brother", "sister", "collegue", "valued", "honorable", "beloved", etc. which may frequently follow a pattern identifier like "Dear") are skipped when extracting a name portion, making use of skipword collections which may be defined independently in rule/pattern catalogue 340, and may be editable as well.

Steps S442 and S460 may be repeated for each single content chunk returned by step S440 so that step S440 returns any name portion, linked with the identifier in which context it was found (cf. dashed return path R461 in FIG. 4B). Duplicates may be removed before continuing the process.

Having extracted the key words in step S460, the process continues to step S462 judging whether or not the user has finished (see afore step S450, for this part). If not ("NO" in step S462), the process returns to step S440.

If the user has finished the feature ("YES" in step S462), the process continues to step S464 using the key words to make a query to email accounts directory 130. Also this step S464 earns some detailed consideration. A first part of step S464 compares the extracted key words (i.e., name portions) with each entry of entries in the address list 330 stored in email accounts directory 130. Then, a second part of step S464 judges whether or not any of the extracted key words matches a particular entry, and if so, in a third part extracts any email address collated in said particular entry. In other words, step S464 returns any email address matching any extracted key word, linked with the respective identifiers in which context the key words were found. Only addresses suitable for the particular email protocol used (e.g., SMTP)

may be chosen by the process. At this point, analyzing section 400*b* of process 400 is finished, and the process enters into finalising section 400*c* illustrated in FIG. 4C which is made reference to, in the following.

Figure 4C:
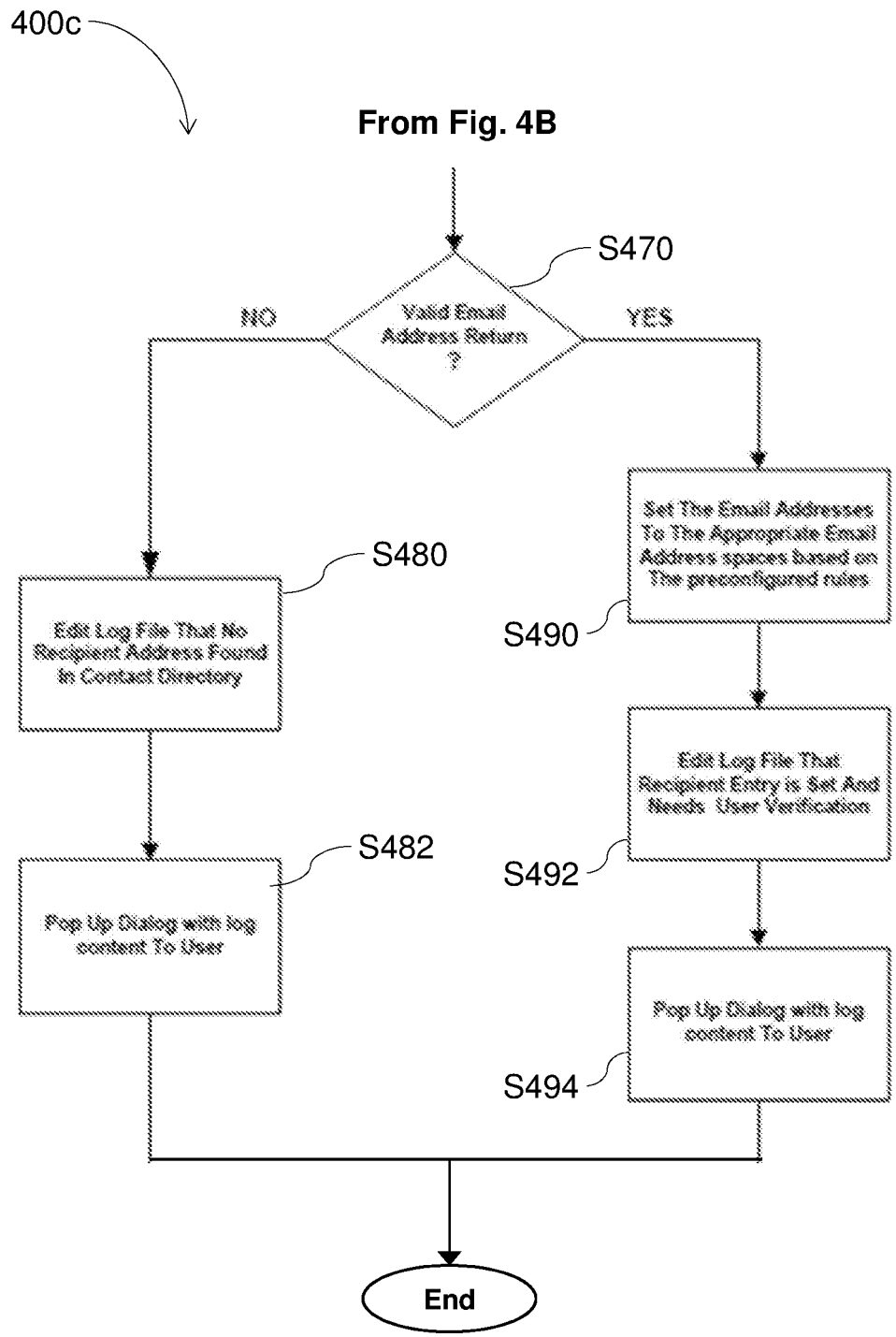

Referring to FIG. 4C entering finalising section 400*c*, step S470 is provided judging whether or not a valid email address was returned from step S464. If no valid email address was returned ("NO" in step S470), the process continues to step S480 editing the log file that no recipient address was found in the contact directory (email account directory 130), followed by step S482 popping up a user dialog including the log content. Then, the process ends.

If a valid email address (i.e., at least one valid email address) was returned ("YES" in step S470), the process continues to step S490 setting the email addresses to the appropriate email address spaces (recipient address input boxes 234, 236, 238) based on the preconfigured rules from configuration database 140, then continues further to step S492 editing the log file that a recipient entry was set (i.e., at least one recipient address was filled into respective recipient address input boxes 234, 236, 238), followed by step S494 popping up a user dialog including the log content. The user dialog mentioned in step S494 may correspond to dialog box 360 of FIG. 3. Then, the process ends.

It is to be noted that the division of process 400 into sections 400*a*, 400*b*, 400*c* is clearly arbitrary and for descriptive reasons only which by no means imply any functional limitations. For example, step S432 described as final step of configuration section 400*a* may as well be understood to form part of the analyzing section 400*b*. Similarly, step S464 described as final step of analyzing section 400*b* may as well be understood to form part of the finalising section 400*c*.

Figure 5:
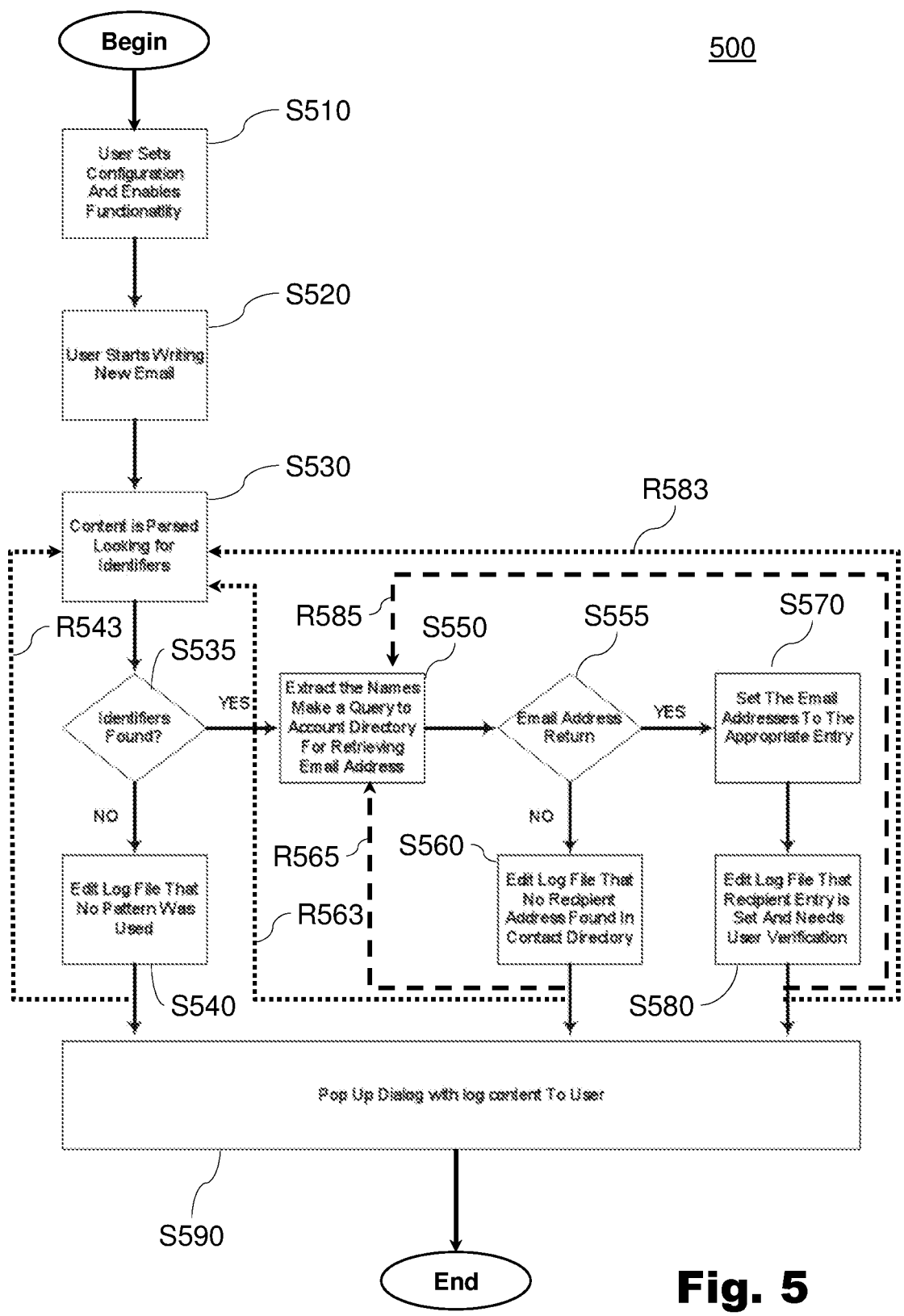
FIG. 5 is a flowchart of a process according to another embodiment of the invention.

In FIG. 5, a flow chart of an example process 500 according to a further embodiment of the present invention is shown. As shown in FIG. 5, after start of the process 500, in a user configuration step S510, a user sets a configuration and enables functionality of the process. I.e., the user is given the opportunity, by automatically prompting a user dialog (e.g., menu 350 of FIG. 3) or by explicitly initiating such step, to configure addressee identifier patterns mentioned above which enables the parsing and identifying steps as described later on. The user configuration step S510 may be skipped at the beginning as default addressee identifier patterns may be defined beforehand. On the other side, the user configuration step may be called at any point of the process, by the user, e.g., by selecting some menu item offered by a client executing the process. Any of a user-configured addressee identifier pattern and a previously defined addressee identifier pattern may be understood to be a predefined addressee identifier pattern, in the sense of the present invention. Additionally, the user may also configure in step S510 which account directory or directories may be used to find a matching email address. If no account directory is configured in step S510, the process may rely on any account directory found by the email client as an account directory assigned to the user, or an account directory defined beforehand. Any of a user-configured account directory and an account directory found or defined beforehand may be understood to be a predefined directory, in the sense of the present invention.

Thereafter, in an email writing start step S520, the user starts writing a new email. In other words, the process 500 remains in a waiting state at this point until it is recognized in step 120 that the user starts writing a new email. Only if the recognizing is made in step S520 the following functionality of the process may begin to work.

After the user is recognized to having started writing a new email in step 120, in a parsing step S530, content of the email is parsed looking for identifiers. In other words, the content of the email is divided into content chunks, a content chunk is selected, and it is decided whether said content chunk matches a predefined addressee identifier pattern. The selecting and deciding is executed for every content chunk one by one.

In step S535, it is judges whether or not identifiers are found. In other words, step S535 returns a positive answer (YES) if at least one content chunk has been decided in step S530 to match a predefined addressee identifier pattern. On the other hand, step S535 returns a negative answer (NO) if no content chunk has been decided in step S530 to match a predefined addressee identifier pattern.

If step S535 returns a "NO", a no-pattern edit step S540 is executed where a log file is edited that no pattern was used. If step S535 returns a "YES", an extracting step S550 follows to extract the names and make a query to an account directory for retrieving an email address. In other words, step S535 includes extracting a name portion from the content chunk under processing, and comparing the extracted name portion with at least one entry of entries of the directory. Then, in step S555 the process judges whether or not the comparing in step S550 has returned an email address. In other words, in step S555 it is judged whether or not the name portion matches the entry of the directory. Of course, the directory may include a multiplicity of entries, and the comparing and judging steps may be repeated for each entry one by one which may return a plurality of email address matchings. In other words, step S555 returns a positive answer (YES) if the name portion has been decided to match at least one entry of a predefined directory. On the other hand, step S555 returns a negative answer (NO) if the name portion has been decided not to match an entry of the predefined directory.

If step S555 returns a "NO", a no-recipient edit step S560 is executed where a log file is edited that no recipient address was found in the contact directory (i. e., the predefined directory). If step S555 returns a "YES", an address setting step S570 is executed. Thereafter, a set-entry edit step S580 is executed where a log file is edited that a recipient address is set and needs user verification. In other words, the log file now includes a recipient address proposal based on an address or addresses which was/were stored in the entry of the directory. It is to be mentioned that only addresses which are suitable for email messaging are set in step S570.

From steps S540, S560, or S580 the process leads to a dialog step S590 where a dialog with log content is popped up to the user. In other words, the user is asked to verify the log file which represents the recipient address proposal in the sense of the present invention. The dialog function of step S590 is linked with a recipient address field function of the email client such that the verified recipient address proposal is finally filled, as verified addresses, into the recipient address field of the message. In a user interface, the verified addresses show up in respective input boxes as shown in FIGS. 2, 3. After that, the process ends.

If more than one name is to be extracted in step S550, unless any name portion to be extracted has been extracted, the process may return to step S550 after steps S560, S580, respectively, which is indicated by respective return paths R565, R585 shown in dashed lines. Likewise, the extracting in step S550 may yield a list of name portions which may be queried, one by one, and processed by steps S555 through S580 in which case, unless any name portion to be processed is processed, the processing may return to step S550 after steps S560, S580, respectively, via respective return paths which coincide, in the drawing, with return paths R565, R585 but do not hook into the extract part but the query part of step S550. Alternatively, a list of names may be queried to the directory as a whole which may return a list of email addresses, in which case returning to step S550 via return paths R565, R585 may be omitted.

As indicated in FIG. 5 by dotted lines, after any of steps S540, S560, S580, the process may return to step S530 via respective return paths R543, R563, R583 to parse again the content of the email. This loop may be run through in predetermined time intervals until the process recognizes that the user has ended writing the email by, e.g., clicking a send button (see button 270 in FIGS. 2, 3).

As a further embodiment of the invention, algorithm feature 320 is further adapted to automatically fill a sender address field as represented by sender address input box 232, instead of or in addition to automatically filling recipient address fields according to the previously described embodiments. E.g., a user may use different sender addresses for personal and professional purposes, each of which addresses being provided, e.g., by email account directory 130 or a separate directory of email client 100. Process 400 or process 500 may be adapted to recognize patterns in a content area used in personal and professional contexts, and propose the appropriate sender address (or a ranked list of sender addresses for selection if ambiguous). The patterns may include typical private identifiers like "With love," or professional identifiers like "Sincerely,". Moreover, patterns may also include evaluating the setting of tags, categories or labels in directory entries represented by items in recipient address input boxes 234, 236, 238, said tags, categories or labels including "family", "friends", or the like as an indication to assume a personal context, and "colleagues", "customers", "suppliers" or the like as an indication to assume a professional context. Colleagues within a company may be addressed from an internal email account by an internal email sender address while family members may be addressed from a private email account by a private email sender address, fellows of a club, society or the like may be addressed from an email account associated to said club, society or the like, by a specialized email sender address, and so on. Unless stated otherwise or obviously inappropriate, any feature described in the context of any embodiment of the invention may be included in or adapted to the present embodiment. The automatic sender address filling method of this embodiment may be realized separately or integrated with the automatic recipient address filling method of any embodiment described before.

For illustrating the concept in real application, an example is described in the following. The example relates to an Outlook* client integration, as a further embodiment of the invention.

An Outlook* add-in offers the opportunity to parse the content of a new email creation via a new Outlook-._MailItem* object configured according to the present invention. While the user types the mail content a timer runs periodically and checks if the content contains the identifiers mentioned in the configuration step, or, when the user finishes the email content, activates the add-in functionality through a button. If this is true then the add-in will catch the name (which is next in the sequence) according to the pattern set in configuration rules. MS Outlook* offers additionally internal Contacts or Exchange Server as a resource for querying and matching the name to the corresponding email address. Then this will be appended in "To" field of the new mail form with a method function according to the present invention which, for example, may appear under the name "message.To.Add (email_address)". Finally the add-in will rise a pop up dialog with either prompting for verification of the recipients list set and proceed with sending the mail or with reporting error in an exception case. A similar concept can be realised as a web browser add-in for web mail case.

The method described herein may easily be adapted to a plurality of requirements. For example, it is easy to understand that the invention is not limited to the pattern identifiers and allocation rules mentioned above. There may be rules prescribing that any message sent to a certain person or group of persons automatically is forwarded to a certain other person or other group of persons.

The invention is further not limited to parsing the content of the main input box. It is conceivable that also the content of the subject input box 220 is analyzed for identifiers. For example, it may be usual in a company that file numbers which a message belongs to are placed between certain characters such as braces, square or angle brackets, or the like, or are introduced by some characteristic passage such as <company_name>&"file no.:", or the like. In such cases, the file number may be extracted from the subject field, and a function may be provided for extracting contact persons from the company's file management database and adding data found in the respective contact entry to the respective data field(s) of the message. Further extracting and allocation rules are easily conceivable by a skilled person in the field.

Hitherto, as mentioned above, there was no way to automatically fill the "To" field of an email, especially if there are a lot of (typically different) personalised emails to be sent. There was the possibility to use the auto-complete feature, or to use an OUTLOOK* form to create personalised forms, which include the email address of the recipient.

According to the present invention, it is proposed to use the context of the email and to extract the required information to populate the "To" field therewith. I. e., most emails follow more or less fixed patterns: "Hello Mr. XYZ", "@ Ms. ABC" or something similar. According to the invention, such patterns are used to configure an algorithm (e.g. an OUTLOOK* plug-in) or may be used as rules by this algorithm, respectively. The algorithm derives attributes of the recipient and, based on these attributes, derives the email address to be used. The rules may be set up, modified and/or deleted by the user and may be very precise.

The context of the email is parsed and analysed by the algorithm, as set forth in the afore description and appended claims. If there is at least one match with a pattern, the name of the recipient is extracted. The name is then used to query a directory and the "To" field is populated with the retrieved address. If this yields more than one address, all addresses are kept and the user has to decide whether to use all addresses or to have just the first one to go into the "To" field and the remaining addresses to go into the "Cc" field. In a further step the user is notified about the finished task and is enabled to review the list of recipients. In other words, rules are set up to exploit frequently used patterns, to look up the recipient's address and then to populate the "To" field (or any other addressee field) of an email.

The present method defines a way of automatically setting recipient and/or sender data in an electronic message like an email or the like by exploiting certain patterns in message content that can be used in combination to certain tools like account directory or contact lists. The advantages are manifold. First it eliminates that time someone spends to set these data. Even if this is just a few seconds, taking into account that a common person writes hundreds of emails per day or a company sending to its thousands or even millions of customers a personal mail, the benefit becomes obvious. Second it is generic and can be very easily applied to all email or other messaging clients either they are desktop applications like Outlook* or web-based like Gmail* or even mobile application clients. Additionally another advantage is that it can be used in mobile devices in which searching the appropriate email directory is tricky and time-consuming and becomes even harder due to display and networking limitations. Furthermore, it eliminates the risk of making a mistake in the recipients list which is likely to occur when the mailing list includes persons with identical or very similar names and someone uses the autocomplete feature or a very quick manual query in the directory list.

The present method is generally applicable to any fields of communication.

It is noted that email client 100 is a mere example of a messaging client in general, and any messaging client is, in principle, able to make use of the invention described before, per se or with adjustments and technical adaptations which should be obvious to a person skilled in the field. Messaging clients may be, besides email clients, SMS or other text messaging clients, SMTP clients, personal messaging clients as stand-alone services such as WhatsApp*, Kik Messenger*, Snapchat* or the like, or as part of social media networks such as Twitter*, Face-book*, Instagram* or the like, instant messaging clients, paging service clients, but are not limited thereby.

Obviously, various applications of the present invention may become apparent to person skilled in the art, based on the information disclosed in the present specification, which might not be mentioned explicitly but are fully covered by the scope of the present application. For example, while the invention is described above to make use of text content only, the inventive method may also make use of any information included in any content field of the message, be it explicit, embedded, or attached.

Specific features of the invention as described above with reference to the exemplary embodiments, may also be implemented in other embodiments, variations or modifications, unless such implementations impose their own prohibitions.

The invention claimed is:

1. A method for filling a recipient address field of a new electronic message and a sending address field of the new electronic message via a messaging application stored in non-transitory memory of communication terminal that runs the messaging application for facilitating sending of the new electronic message via a network, the communication terminal configured for communicatively connecting to the network over which the new electronic message is sendable, the method comprising:
    generating a new electronic message having content in a content area of a body of the new electronic message based on input received by the communication terminal, the new electronic message also having a recipient address field and a sender address field that are not within the body of the new electronic message and are not within the content area of the body;
    during generation of the new electronic message:
        generating a plurality of first content chunks within the content area by dividing the content area into a plurality of first content chunks that each have a first chunk length, the first chunk length being adapted to a length of a first predefined addressee identifier pattern;
    the communication terminal deciding whether each first content chunk includes content that matches the first predefined addressee identifier pattern; and
    upon a determination that the content of the first content chunks matches the first predefined addressee identifier pattern:
        automatically extracting a name portion from the first content chunks,
        automatically comparing the name portion with entries of a predefined directory,
        upon a determination that the name portion matches at least one of the entries, automatically creating a first recipient address proposal based on an address stored in the entries of the predefined directory in a format suitable for the new electronic message, and
        filling the first recipient address proposal into the recipient address field of the new electronic message;
    upon determination that there is a second predefined addressee identifier pattern within the content area, dividing the content area into second content chunks that each have a second chunk length, the second chuck length being adapted to the second predefined addressee identifier pattern,
    the communication terminal deciding whether the second content chunks includes content that matches the second predefined addressee identifier pattern; and
    upon a determination that the content of the second content chunks matches the second predefined addressee identifier pattern:
        automatically extracting a name portion from the second content chunks and automatically comparing that name portion with entries of the predefined directory,
        upon a determination that the name portion matches at least one of the entries, automatically creating a second recipient address proposal based on an address stored in the entries of the predefined directory in a format suitable for the new electronic message, and
        filling the second recipient address proposal into the recipient address field of the new electronic message;
    upon determination that there is a third predefined addressee identifier pattern within the content area, dividing the content area into third content chunks that each have a third chunk length, the third chuck length being adapted to the third predefined addressee identifier pattern;
    the communication terminal deciding whether the third content chunks include content that matches the third predefined addressee identifier pattern; and
    upon a determination that at least one of the third content chunks is decided to match the predefined addressee identifier pattern:
        extracting a sender name portion from said third content chunks,
        comparing the sender name portion with at least one entry of entries of a predefined directory, and
        upon a determination that the sender name portion matches at least one entry of the entries of the predefined directory:
            creating a sender address proposal suitable for a format of the new electronic message, based on information stored in at least one entry of the directory that matches the sender name portion, filling the sender address proposal into the sender address field of the new electronic message; and initiating sending of the new electronic message via a network to which the communication terminal is connectable such that the new electronic message that is sent has the sender address proposal filled in the sender address field of the new electronic message and the first recipient address proposal and the second recipient address proposal in the recipient address field of the new electronic message.

2. The method of claim 1, wherein the first predefined addressee identifier pattern is taken from a pattern catalogue and wherein the pattern catalogue is sorted and/or scanned in order of decreasing chunk length, and wherein the pattern catalogue is editable by a user of the messaging application.

3. The method of claim 1, wherein the first recipient address proposal is a recipient address list.

4. The method of claim 3, including further steps to be executed prior to executing the filling of the first recipient address proposal into the recipient address field of the new electronic message:

offering the first recipient address list to a user for selection and/or verification via a display of the communication terminal; and discarding addresses not selected and/or verified by the user from the first recipient address list.

5. The method of claim 3, wherein:

the recipient address field includes a plurality of recipient address sub-fields; and the first recipient address list includes a plurality of recipient address sub-lists corresponding to said plurality of recipient address sub-fields, and the first predefined pattern is assigned to at least one of the recipient address sub-lists and the second predefined pattern is assigned to at least one other one of the recipient address sub-lists.

6. The method of claim 5 wherein selection by the user includes moving an address from one recipient address sub-list to another recipient address sub-list.

7. The method of claim 1, wherein the filling of the first recipient address proposal into the recipient address field of the new electronic message occurs automatically during composition of the new electronic message, and wherein the communication terminal performs the initiating of the sending of the new electronic message via the network.

8. The method of claim 1, wherein the method is executed at predefined points of time, during which content for the new electronic message is being written in the body of the new electronic message via input the communication terminal receives from the user.

9. The method of claim 1, wherein the new electronic message is an email or an SMS, and wherein the method is executed in a form of an email application plug-in, a browser add-on or a mobile phone messaging application.

10. The method of claim 1, wherein the first content chunks and the second content chunks and the third content chunks are each generated from a whole content area or selected parts thereof within the body of the new electronic message, wherein each of the first content chunks includes a line of characters within the body of the new electronic message that is not within the recipient address field and is also not within the sender address field and each of the second content chunks includes a line of characters within the body of the new electronic message that is not within the recipient address field and is also not within the sender address field and each of the third content chunks includes a line of characters within the body of the new electronic message that is not within the recipient address field and is also not within the sender address field.

11. The method of claim 1, wherein the communication terminal is a desktop computer, a portable computer, a tablet, a telephone, a mobile phone, a smart phone, or a PDA.

12. The method of claim 1, comprising:

breaking the name portion into name fractions corresponding to respective data fields in the directory, the name fractions including at least one of a prename, surname, title, and/or salutation; and comparing the name portion with the entries of the directory by the name fractions.

13. A non-transitory computer readable medium having a messaging application stored thereon such that the messaging application is executable via a processor of the communication terminal, the method comprising:

generating a new electronic message having content in a content area within a body of the new electronic message based on input received by the communication terminal;

selecting a content chunk from a content field within a body of the generated new electronic message, the body of the new electronic message comprising content to be transmitted, the new electronic message also having a recipient address field and a sender address field that are not within the body of the new electronic message;

automatically deciding whether the content chunk matches a predefined addressee identifier pattern; and upon a determination that the content chunk is decided to match the predefined addressee identifier pattern:

extracting a name portion from said content chunk, comparing the name portion with at least one entry of entries of a predefined directory, and upon a determination that the name portion matches at least one entry of the entries of the predefined directory:

creating a sender address proposal suitable for a format of the new electronic message, based on information stored in at least one entry of the directory that matches the name portion, filling the sender address proposal into the sender address field of the new electronic message; and initiating sending of the new electronic message with the sender address proposal filled in the sender address field via a network to which the communication terminal is connectable.

14. The non-transitory computer readable medium of claim 13, wherein the filling of the sender address proposal into the sender address field of the new electronic message is performed automatically after the creating of the sender address proposal and wherein the recipient address field and a sender address field that are not within the content area of the body and are not within the body of the new electronic message.

15. The non-transitory computer readable medium of claim 13, wherein the selecting and the automatic deciding is repeatedly executed for a plurality of content chunks, the content chunks being generated from a whole content area or selected parts thereof within a body of the new electronic message, wherein each content chunk includes a line of characters within the body of the new electronic message that is not within the recipient address field and is also not within the sender address field.

16. A communication terminal comprising a processor and non-transitory memory, the communication terminal being communicatively connectable to a network over which electronic messages generated by the communication terminal are sendable, a messaging application being stored in the memory such that the messaging application is executable by the processor of the communication terminal, the messaging application defining a method that is executed by the communication terminal when the messaging application is run by the communication terminal in which the communication terminal:

generates a new electronic message having content in a content area of a body of the new electronic message based on input received by the communication terminal, the new electronic message also having a recipient address field and a sender address field that are not within the body of the new electronic message and are not within the content area of the body, wherein during generation of the new electronic message the communication terminal:

generates a plurality of first content chunks within the content area by dividing the content area into a plurality of first content chunks that each have a first chunk length, the first chunk length being adapted to a length of a first predefined addressee identifier pattern;

decides whether each first content chunks includes content that matches the first predefined addressee identifier pattern; and upon a determination that the content of the first content chunks matches the first predefined addressee identifier pattern:

automatically extracts a name portion from the first content chunk, automatically compares the name portion with entries of a predefined directory, upon a determination that the name portion matches at least one of the entries, automatically creates a first recipient address proposal based on an address stored in the entries of the predefined directory in a format suitable for the new electronic message, and fills the first recipient address proposal into the recipient address field of the new electronic message;

upon determination that there is a second predefined addressee identifier pattern within the content area, divides the content area into second content chunks that each have a second chunk length, the second chuck length being adapted to the second predefined addressee identifier pattern, decides whether the second content chunks includes content that matches the second predefined addressee identifier pattern; and upon a determination that the content of the second content chunks matches the second predefined addressee identifier pattern:

automatically extracts a name portion from the second content chunk and automatically comparing that name portion with entries of the predefined directory, upon a determination that the name portion matches at least one of the entries, automatically creates a second recipient address proposal based on an address stored in the entries of the predefined directory in a format suitable for the new electronic message, and fills the second recipient address proposal into the recipient address field of the new electronic message;

upon determination that there is a third predefined addressee identifier pattern within the content area, divides the content area into third content chunks that each have a third chunk length, the third chuck length being adapted to the third predefined addressee identifier pattern;

decides whether the third content chunks include content that matches the third predefined addressee identifier pattern; and upon a determination that at least one of the third content chunks is decided to match the predefined addressee identifier pattern:

extracts a sender name portion from said third content chunks, compares the sender name portion with at least one entry of entries of a predefined directory, and upon a determination that the sender name portion matches at least one entry of the entries of the predefined directory:

creates a sender address proposal suitable for a format of the new electronic message, based on information stored in at least one entry of the directory that matches the sender name portion, fills the sender address proposal into the sender address field of the new electronic message; and facilitates sending of the new electronic message via a network to which the communication terminal is connectable such that the new electronic message that is sent has the sender address proposal filled in the sender address field of the new electronic message and the first recipient address proposal and the second recipient address proposal in the recipient address field of the new electronic message.

17. The communication terminal of claim 16 wherein the communication terminal comprises a server, a desktop computer, a portable computer, a tablet, a telephone, a mobile phone, a smart phone or a PDA.

18. The communication terminal of claim 16, comprising:

a display, wherein the communication terminal is configured to display the first recipient address proposal for selection and/or verification.

19. The communication terminal of claim 18, wherein the communication terminal is configured to discard addresses not selected and/or verified by the user from the recipient address list.

20. The communication terminal of claim 16, wherein the communication terminal automatically fills the first recipient address proposal into the recipient address field of the new electronic message after the first recipient address proposal is created.

* * * * *